(12) United States Patent
Sarkhel et al.

(10) Patent No.: US 12,050,647 B2
(45) Date of Patent: Jul. 30, 2024

(54) OPEN-DOMAIN TRENDING HASHTAG RECOMMENDATIONS

(71) Applicant: Adobe Inc., San Jose, CA (US)

(72) Inventors: Somdeb Sarkhel, San Jose, CA (US); Xiang Chen, San Jose, CA (US); Viswanathan Swaminathan, Saratoga, CA (US); Swapneel Mehta, New York, NY (US); Saayan Mitra, San Jose, CA (US); Ryan Rossi, Santa Clara, CA (US); Han Guo, San Jose, CA (US); Ali Aminian, San Jose, CA (US); Kshitiz Garg, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/877,469

(22) Filed: Jul. 29, 2022

(65) Prior Publication Data
US 2024/0037149 A1 Feb. 1, 2024

(51) Int. Cl.
*G06F 16/90* (2019.01)
*G06F 16/901* (2019.01)
*G06N 3/045* (2023.01)
*G06Q 50/00* (2012.01)

(52) U.S. Cl.
CPC ......... *G06F 16/9024* (2019.01); *G06N 3/045* (2023.01); *G06Q 50/01* (2013.01)

(58) Field of Classification Search
CPC ..... G06F 16/9024; G06N 3/045; G06Q 50/01
USPC .......................................................... 707/798
See application file for complete search history.

(56) References Cited

U.S. PATENT DOCUMENTS

| | | | |
|---|---|---|---|
| 2015/0264445 A1* | 9/2015 | Lock ................... | G06F 16/9024 725/39 |
| 2016/0224686 A1* | 8/2016 | Ramanathan ......... | G06F 16/951 |
| 2018/0285478 A1* | 10/2018 | Wright .................. | G06F 16/248 |
| 2020/0394499 A1* | 12/2020 | Yao ........................ | G06N 5/022 |
| 2022/0237384 A1* | 7/2022 | Torene ................ | G06F 16/9566 |

OTHER PUBLICATIONS

About Instamancer, Available Online at: https://adamsm.com/instamancer/, 6 pages.

(Continued)

*Primary Examiner* — Vincent F Boccio
(74) *Attorney, Agent, or Firm* — Kilpatrick Townsend & Stockton LLP

(57) ABSTRACT

Techniques for recommending hashtags, including trending hashtags, are disclosed. An example method includes accessing a graph. The graph includes video nodes representing videos, historical hashtag nodes representing historical hashtags, and edges indicating associations among the video nodes and the historical hashtag nodes. A trending hashtag is identified. An edge is added to the graph between a historical hashtag node representing a historical hashtag and a trending hashtag node representing the trending hashtag, based on a semantic similarity between the historical hashtag and the trending hashtag. A new video node representing a new video is added to the video nodes of the graph. A graph neural network (GNN) is applied to the graph, and the GNN predicts a new edge between the trending hashtag node and the new video node. The trending hashtag is recommended for the new video based on prediction of the new edge.

20 Claims, 7 Drawing Sheets

(56) References Cited

OTHER PUBLICATIONS

Andrew Nord, Available Online at: https://github.com/drawrowfly, Jan. 2024, 3 pages.
English Word Vectors, Available Online at: https://fasttext.cc/docs/en/english-vectors.html, 2022, 2 pages.
Yes, Twitter is a Source of Journalism, Mark Ingram, Mathewingramcom-work, 2008.
Anderson et al., How Social Media is Reshaping News, Pew Research Center, Sep. 24, 2014, 7 pages.
Annamoradnejad et al., A Comprehensive Analysis of Twitter Trending Topics, Available online at: https://arxiv.org/ftp/arxiv/papers/1907/1907.09007.pdf, Jul. 2019, 6 pages.
Badawy et al., Analyzing the Digital Traces of Political Manipulation: The 2016 Russian Interference Twitter Campaign, Proceedings of the 2018 IEEE/ACM International Conference on Advances in Social Networks Analysis and Mining (ASONAM), Aug. 2018, pp. 258-265.
Bahdanau et al., Neural Machine Translation by Jointly Learning to Align and Translate, International Conference on Learning Representations, Available Online at: https://arxiv.org/pdf/1409.0473.pdf, May 19, 2016, pp. 1-15.
Basch et al., Covid-19 on Tiktok: Harnessing an Emerging Social Media Platform to Convey Important Public Health Messages, International Journal of Adolescent Medicine and Health, vol. 34, No. 5, Aug. 11, 2020, pp. 367-369.
Bauckhage et al., How Viral Are Viral Videos?, Proceedings of the International AAAI Conference on Web and Social Media, vol. 9, 2015, pp. 22-30.
Bender, The BenderRule: On Naming the Languages We Study and Why It Matters, The Gradient, 2019, 22 pages.
Bessi et al., Users Polarization on Facebook and Youtube, Plos One, vol. 11, No. 8, Apr. 10, 2016, pp. 1-13.
Blaszka et al., #WorldSeries: An Empirical Examination of a Twitter Hashtag During a Major Sporting Event, International Journal of Sport Communication, vol. 5, No. 4, Dec. 2012, pp. 435-453.
Bojanowski et al., Enriching Word Vectors with Subword Information, Transactions of the Association of Computational Linguistics, vol. 5, No. 1, Jun. 19, 2017, pp. 135-146.
Bruns, From Prosumer to Produser: Understanding User-led Content Creation, Transforming Audiences, 2009.
Bruns et al., Produsage: A Closer Look at Continuing Developments, New Review of Hypermedia and Multimedia, vol. 17, No. 1, Apr. 2011, pp. 3-7.
Bruns et al., The Future is User-Led: The Path towards Widespread Produsage, The 7th International Digital Arts and Culture Conference: Curtin University of Technology, 2007, 10 pages.
Chang et al., A New Perspective on Twitter Hashtag Use: Diffusion of Innovation Theory, Proceedings of the American Society for Information Science and Technology, vol. 47, No. 1, Oct. 22, 2010, 4 pages.
Chapple et al., TikTok Crosses 2 Billion Downloads After Best Quarter for Any App Ever, Sensor Tower, vol. 15, Apr. 2020, 4 pages.
Chaslot et al., The Toxic Potential of Youtube's Feedback Loop, Wired, Available online at: https://www.wired.com/story/the-toxic-potential-of-youtubes-feedback-loop/, Jul. 13, 2019, 10 pages.
Chen et al., Beyond Triplet Loss: A Deep Quadruplet Network for Person Re-Identification, Proceedings of the IEEE Conference on Computer Vision and Pattern Recognition, Apr. 6, 2017, 10 pages.
Chen et al., VGGSound: A Large-scale Audio-Visual Dataset, Available online at: arXiv:2004.14368v2 [cs.CV], Sep. 25, 2020, 10 pages.
Cinelli et al., The Echo Chamber Effect on Social Media, Proceedings of the National Academy of Sciences, vol. 118, No. 9, Feb. 23, 2021, pp. 1-8.
Clark, "Hope in a Hashtag": The Discursive Activism of #WhyIStayed, Feminist Media Studies, vol. 16, No. 5, Feb. 22, 2016, pp. 788-804.
Coates et al., The Effect of Influencer Marketing of Food and a "Protective Advertising Disclosure on Children's Food Intake", Pediatric Obesity, vol. 14, No. 10, Oct. 2019, pp. 1-9.
Cohen, Exploring Echo-Systems: How Algorithms Shape Immersive Media Environments, Journal of Media Literacy Education, vol. 10, No. 2, 2018, pp. 139-151.
Correa et al., Mining Tweets for Tag Recommendation on Social Media, Available online at: https://doi.org/10.1145/2065023.2065040, Oct. 2011, pp. 69-76.
Covington et al., Deep Neural Networks for YouTube Recommendations, Proceedings of the 10th ACM Conference on Recommender Systems, Sep. 2016, pp. 191-198.
D'Anastasio, Blood, Poop, and Violence: YouTube Has a Creepy Minecraft Problem, Available online at: https://www.wired.com/story/youtube-minecraft-among-us-disturbing-videos/, Mar. 30, 2021, 12 pages.
Davidson et al., The Youtube Video Recommendation System, Proceedings of the fourth ACM conference on Recommender Systems, Sep. 2010, pp. 293-296.
Denton et al., User Conditional Hashtag Prediction for Images, Proceedings of the 21th ACM SIGKDD International Conference on Knowledge Discovery and Data Mining, Aug. 2015, pp. 1731-1740.
Devlin et al., BERT: Pre-Training of Deep Bidirectional Transformers for Language Understanding, Available online at: https://arxiv.org/pdf/1810.04805.pdf, May 24, 2019, 16 pages.
Ding et al., Broadcast Yourself: Understanding YouTube Uploaders, Proceedings of the 2011 ACM SIGCOMM Conference on Internet Measurement Conference, Nov. 2011, pp. 361-370.
Dong et al., Triplet Loss in Siamese Network for Object Tracking, Proceedings of the European Conference on Computer Vision (ECCV), Oct. 6, 2018, pp. 1-16.
Donzelli et al., Misinformation on Vaccination: A Quantitative Analysis of Youtube Videos, Human Vaccines and Immunotherapeutics, vol. 14, No. 7, Jul. 3, 2018, pp. 1654-1659.
Durand, Learning User Representations for Open Vocabulary Image Hashtag Prediction, Available online at: https://openaccess.thecvf.com/content_CVPR_2020/papers/Durand_Learning_User_Representations_for_Open_Vocabulary_Image_Hashtag_Prediction_CVPR_2020_paper.pdf, 2020, pp. 9769-9778.
Forney, The Viterbi Algorithm, Proceedings of the Institute of Electrical and Electronics Engineers, vol. 61, No. 3, Mar. 1973, pp. 268-278.
Ge et al., Deep Metric Learning with Hierarchical Triplet Loss, Available online at: https://arxiv.org/pdf/1810.06951.pdf, Oct. 16, 2018, pp. 1-18.
Gehring et al., A Convolutional Encoder Model for Neural Machine Translation, Facebook AI Research, Jul. 25, 2017, 13 pages.
Grave et al., Learning Word Vectors for 157 Languages, Proceedings of the Eleventh International Conference on Language Resources and Evaluation, Available Online at: https://aclanthology.org/L18-1550.pdf, May 2018, pp. 3483-3487.
Gruzd et al., Going Viral: How a Single Tweet Spawned a COVID-19 Conspiracy Theory on Twitter, Big Data & Society, vol. 7, No. 2, Jul. 20, 2020, 9 pages.
Gu et al., The Fake News Machine: How Propagandists Abuse the Internet and Manipulate the Public, Micro, vol. 5, 2017, 81 pages.
Han et al., Video Representation Learning by Dense Predictive Coding, Proceedings of the IEEE/CVF International Conference on Computer Vision Workshops, Sep. 27, 2019, 13 pages.
Hara et al., Can Spatiotemporal 3D CNNs Retrace the History of 2D CNNs and ImageNet?, Proceedings of the IEEE Conference on Computer Vision and Pattern Recognition (CVPR), Apr. 2, 2018, 10 pages.
Hara et al., Learning Spatio-Temporal Features with 3D Residual Networks for Action Recognition, Proceedings of the IEEE International Conference on Computer Vision Workshops, Aug. 25, 2017, 7 pages.
He et al., Deep Residual Learning for Image Recognition, Institute of Electrical and Electronics Engineers Conference on Computer Vision and Pattern Recognition (CVPR), Jun. 27-30, 2016, pp. 770-778.

(56) References Cited

OTHER PUBLICATIONS

Hochreiter et al., Long Short-Term Memory, Neural Computation, vol. 9, No. 8, Nov. 15, 1997, 32 pages.

Jain et al., A Survey on Hashtag Recommendations, Conference of Open Innovations Association, Proceeding of the 27th Conference of Fruct Association, Sep. 9, 2020, 5 pages.

Jain et al., Extreme Multi-label Loss Functions for Recommendation, Tagging, Ranking & Other Missing Label Applications, Proceedings of the 22nd ACM SIGKDD International Conference on Knowledge Discovery and Data Mining, Aug. 13-17, 2016, 10 pages.

Jain et al., HashJacker—Detection and Analysis of Hashtag Hijacking on Twitter, International Journal of Computer Applications, vol. 114, No. 19, Mar. 2015, pp. 17-20.

Java et al., Why We Twitter: Understanding Microblogging Usage and Communities, Proceedings of the 9th WebKDD and 1st SNA-KDD 2007 Workshop on Web Mining and Social Network Analysis, 2007, 10 pages.

Jiang et al., Degenerate Feedback Loops in Recommender Systems, Proceedings of the 2019 AAAI/ACM Conference on AI, Ethics, and Society, Mar. 27, 2019, 10 pages.

Jiang et al., Viral Video Style: A Closer Look at Viral Videos on YouTube, Conference: Proceedings of International Conference on Multimedia Retrieval, Apr. 2014, 9 pages.

Jin et al., Instafamous and Social Media Influencer Marketing, Marketing Intelligence & Planning, Mar. 21, 2019, pp. 567-579.

Joy et al., Disruption by Reliance Jio in Telecom Industry, International Journal of Pure and Applied Mathematics, vol. 118, No. 20, 2018, pp. 43-49.

Kingma et al., ADAM: A Method For Stochastic Optimization, International Conference on Learning Representations, Conference paper at ICLR 2015, Jan. 30, 2017, 15 pages.

Kipf et al., Semi-Supervised Classification with Graph Convolutional Networks, Published as a Conference Paper at ICLR 2017, Feb. 22, 2017, pp. 1-14.

Kollanyi et al., Bots and Automation Over Twitter during the U.S. Election, Computational Propaganda Project: Working Paper Series, Nov. 17, 2016, 5 pages.

Kornblith et al., What's in a Loss Function for Image Classification?, Computer Vision and Pattern Recognition, Oct. 30, 2020, 20 pages.

Kumar et al., From Fully Supervised to Zero Shot Settings for Twitter Hashtag Recommendation, Information Retrieval, Jun. 11, 2019, 12 pages.

Kumar et al., Toward Maximizing the Visibility of Content in Social Media Brand Pages: A Temporal Analysis, Social Network Analysis and Mining, vol. 8, No. 1, Aug. 22, 2019, 22 pages.

Kywe et al., A Survey of Recommender Systems in Twitter, International Conference on Social Informatics, Springer, Dec. 2012, 12 pages.

Kywe et al., On Recommending Hashtags in Twitter Networks, International Conference on Social Informatics, Springer, Dec. 2012, 15 pages.

Leonhardt, Tweets, Hashtags and Virality: Marketing the Affordable Care Act in Social Media, Journal of Direct, Data and Digital Marketing Practice, vol. 16, Apr. 9, 2015, pp. 172-180.

Li et al., Long-tail Hashtag Recommendation for Micro-videos with Graph Convolutional Network, Proceedings of the 28th ACM International Conference on Information and Knowledge Management, Nov. 3, 2019, pp. 509-518.

Lin et al., #Bigbirds Never Die: Understanding Social Dynamics of Emergent Hashtag, Proceedings of the International AAAI Conference on Web and Social Media, vol. 7, Mar. 28, 2013, 13 pages.

Lindh et al., Rationality Versus Emotionality Among Online Shoppers: the Mediating Role of Experts as Enhancing Influencer Effect on Purchasing Intent, Journal of Customer Behaviour, vol. 16, No. 4, Dec. 2017, 19 pages.

Loshchilov et al., Decoupled Weight Decay Regularization, International Conference on Learning Representations, Nov. 14, 2017, pp. 1-13.

Lu et al., Recommender System Application Developments: a Survey, Decision Support Systems, vol. 74, Jun. 2015, pp. 12-32.

Mahajan et al., Exploring the Limits of Weakly Supervised Pretraining, Proceedings of the European Conference on Computer Vision (ECCV), May 2, 2018, 23 pages.

Maheshwari, On YouTube Kids, Startling Videos Slip Past Filters, The New York Times, vol. 4, Nov. 4, 2017.

Mazarr et al., Hostile Social Manipulation Present Realities and Emerging Trends, Technical Report, 2019, 303 pages.

Mikolov et al., Advances in Pre-Training Distributed Word Representations, Proceedings of the Eleventh International Conference on Language Resources and Evaluation (LREC 2018), May 2018, pp. 52-55.

Najafabadi, A Research Agenda for Distributed Hashtag Spoiling: Tails of a Survived Trending Hashtag, Proceedings of the 18th Annual International Conference on Digital Government Research, Jun. 7, 2017, 9 pages.

Naraine, #WeTheNorth: Examining an Online Brand Community Through a Professional Sport Organization's Hashtag Marketing Campaign, Communication & Sport, vol. 9, No. 4, Oct. 8, 2019.

Park et al., Attend to You: Personalized Image Captioning with Context Sequence Memory Networks, In IEEE Conference on Computer Vision and Pattern Recognition (CVPR), 2017, pp. 895-903.

Palomino et al., The Nature of Twitter Trending Topics Analysing Intrinsic Factors Associated with the Twitter Ecosystem, New Trends in Intelligent Software Methodologies, Tools and Techniques, May 2018, 15 pages.

Rauschnabel et al., What Motivates Users to Hashtag on Social Media?, Phychology & Marketing, vol. 36, No. 5, May 2019, pp. 473-488.

Rawat et al., ConTagNet: Exploiting User Context for Image Tag Recommendation, Available Online at: https://www.bing.com/search?, Oct. 2016, pp. 1102-1106.

Reimers et al., Sentence-BERT: Sentence Embeddings using Siamese BERT-Networks, Available online at: https://arxiv.org/pdf/1908.10084.pdf, Aug. 27, 2019, 11 pages.

Ristovska, The Rise of Eyewitness Video and Its Implications for Human Rights: Conceptual and Methodological Approaches, Journal of Human Rights, vol. 15, No. 3, Sep. 8, 2016, pp. 347-360.

Saquib et al., Understanding Dynamics of Trending Topics in Twitter, International Conference on Computing, Communication and Automation (ICCCA), Dec. 21, 2017, pp. 98-103, Abstract, pp. 1-4.

Sculley et al., Hidden Technical Debt in Machine Learning Systems, Dec. 7, 2015, pp. 2503-2511.

Serrano et al., Dancing to the Partisan Beat: A First Analysis of Political Communication on TikTok, Association for Computing Machinery, May 11, 2020, 10 pages.

Shani et al., Evaluating Recommendation Systems, Recommender Systems Handbook, 2011, 43 pages.

Shao et al., The Spread of Fake News by Social Bots, Available Online at: https://arxiv.org/pdf/1707.07592v1.pdf, Jul. 24, 2017, 16 pages.

Shearer et al., News Use Across Social Media Platforms in 2020, Available Online at: https://pewrsr.ch/3e2GS0v, Jan. 12, 2021, 18 pages.

Shin et al., The Power of e-WOM Using the Hashtag: Focusing on SNS Advertising of SPA Brands, International Journal of Advertising, Jan. 2, 2018, pp. 71-85.

Skaza et al., Modeling the Infectiousness of Twitter Hashtags, Physica A: Statistical Mechanics and its Applications, vol. 465, Jan. 1, 2017, pp. 289-296.

Sun et al., Videobert: A Joint Model for Video and Language Representation Learning, International Conference on Computer Vision (ICCV), 2019, 10 pages.

Swift et al., From Hashtag to High School: How Viral Tweets Are Inspiring Young Scientists to Embrace STEM, Journal of Microbiology & Biology Education, Nov. 12, 2020, 5 pages.

Vandam et al., Detecting Hashtag Hijacking from Twitter, Proceedings of the 8th ACM Conference on Web Science, May 22, 2016, pp. 370-371.

(56) References Cited

OTHER PUBLICATIONS

Vaswani et al., Attention is All You Need, 31st Conference on Neural Information Processing Systems (NIPS 2017), Jun. 2017, 11 pages.

Veit et al., Learning from Noisy Large-Scale Datasets with Minimal Supervision, Computer Vision and Pattern Recognition, Jan. 6, 2017, pp. 839-847.

Veit et al., Separating Self-Expression and Visual Content in Hashtag Supervision, Proceedings of the IEEE Conference on Computer Vision and Pattern Recognition, Nov. 27, 2017, 11 pages.

Velickovic et al., Graph Attention Networks, Published as a Conference Paper at ICLR 2018, Feb. 4, 2018, pp. 1-12.

Wang et al., Hashtags and Information Virality in Networked Social Movement: Examining Hashtag Co-occurrence Patterns, Online Information Review, Nov. 14, 2016, pp. 1468-4527.

Wang et al., Heterogeneous Graph Attention Network, Social and Information Networks, Mar. 18, 2019, pp. 2022-2032.

Wei et al., Personalized Hashtag Recommendation for Micro-videos, Available Online at: https://arxiv.org/pdf/1908.09987.pdf, Aug. 27, 2019, pp. 1446-1454.

Weimann et al., Research Note: Spreading Hate on TikTok, Studies in Conflict & Terrorism, vol. 46, No. 5, Jun. 19, 2020, pp. 752-765.

Xiong et al., Hashtag Activism and Message Frames Among Social Movement Organizations: Semantic Network Analysis and Thematic Analysis of Twitter During the #Me Too Movement, Public Relations Review, vol. 45, No. 1, Mar. 2019, pp. 10-23, Abstract, pp. 1-5.

Yalniz et al., Billion-scale Semi-supervised Learning for Image Classification, Available Online at: https://arxiv.org/pdf/1905.00546.pdf, May 2, 2019, 12 pages.

Yang , Narrative Agency in Hashtag Activism: the Case of #blacklivesmatter, Media and Communication, vol. 4, No. 4, Aug. 2016.

Yang et al., Sentiment Enhanced Multi-modal Hashtag Recommendation for Micro-videos, IEEE Access, Apr. 22, 2020, pp. 78252-78264.

Yu et al., Correcting the Triplet Selection Bias for Triplet Loss, In Proceedings of the European Conference on Computer Vision, 2018, pp. 71-87.

Yu et al., Spatial Pyramid-enhanced NetVLAD with Weighted Triplet Loss for Place Recognition, IEEE Transactions on Neural Networks and Learning Systems, vol. 31, No. 2, Feb. 2020, pp. 661-674.

Zhang et al., A Review on Multi-Label Learning Algorithms, IEEE Transactions on Knowledge and Data Engineering, vol. 26, No. 8, Mar. 2013, 42 pages.

Zhang et al., Deep Learning based Recommender System: A Survey and New Perspectives, ACM Computing Surveys, vol. 1, Issue 1, Article 1, 2018, 35 pages.

Zhou, A Brief Introduction to Weakly Supervised Learning, National Science Review, vol. 5, No. 1, 2018, pp. 44-53.

\* cited by examiner

OPEN-DOMAIN TRENDING HASHTAG RECOMMENDATIONS

TECHNICAL FIELD

This disclosure generally relates to machine learning and, more particularly, to techniques for using a machine learning model to recommend trending hashtags in an open domain.

BACKGROUND

On social media platforms, trends and hashtags are important to content discovery and can be direct drivers of engagement. For instance, a user may post content on social media along with one or more hashtags for the content. The hashtags act as keywords for the content, enabling the content to be searched and thus found by others. Additionally, if any of the hashtags is trending (i.e., experiencing a period of popularity), then the content may receive a high level of visibility on the social media platform. This visibility can lead to an increase in audience size for the user, which can in turn lead to an increase an income for the user if leveraged properly.

SUMMARY

Some embodiments of a recommendation system described herein recommend hashtags, including trending hashtags, for videos to be posted on social media platforms or elsewhere. An example of such a recommendation system accesses social media data including indications of videos and historical hashtags. In the social media data, a historical hashtag is associated with a video if the historical hashtag is known to have been associated with the video when the video was posted on a social media platform.

Based the social media data and further based on indications of trending hashtags, the recommendation system can construct a graph. Initially, an example of the graph includes video nodes representing videos in the social media data and historical hashtag nodes representing historical hashtags in the social media data. The recommendation system provides edges in the graph to represent relationships between videos and historical hashtags in the social media data. Upon receiving an indication of a trending hashtag, the recommendation system adds to the graph a trending hashtag node representing the trending hashtag. The recommendation system also adds to the graph one or more edges connecting the trending hashtag node to historical hashtag nodes representing historical hashtags that are semantically similar to the rending hashtag.

When the recommendation system receives an indication of a new video, for instance, from a user, an example of the recommendation system adds a new video node to the graph to represent the new video. The recommendation system then provides the graph, including the new video node and also including one or more trending hashtag nodes, to a trained graph neural network (GNN) configured to predict edges in the graph. The GNN outputs an updated version of the graph, including edges connecting the new video node to one or more hashtag nodes, such as historical hashtag nodes and trending hashtag nodes. The recommendation system then outputs a recommendation for the video, where that recommendation includes the hashtags represented by the hashtag nodes to which the new video node is connected in the updated graph.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
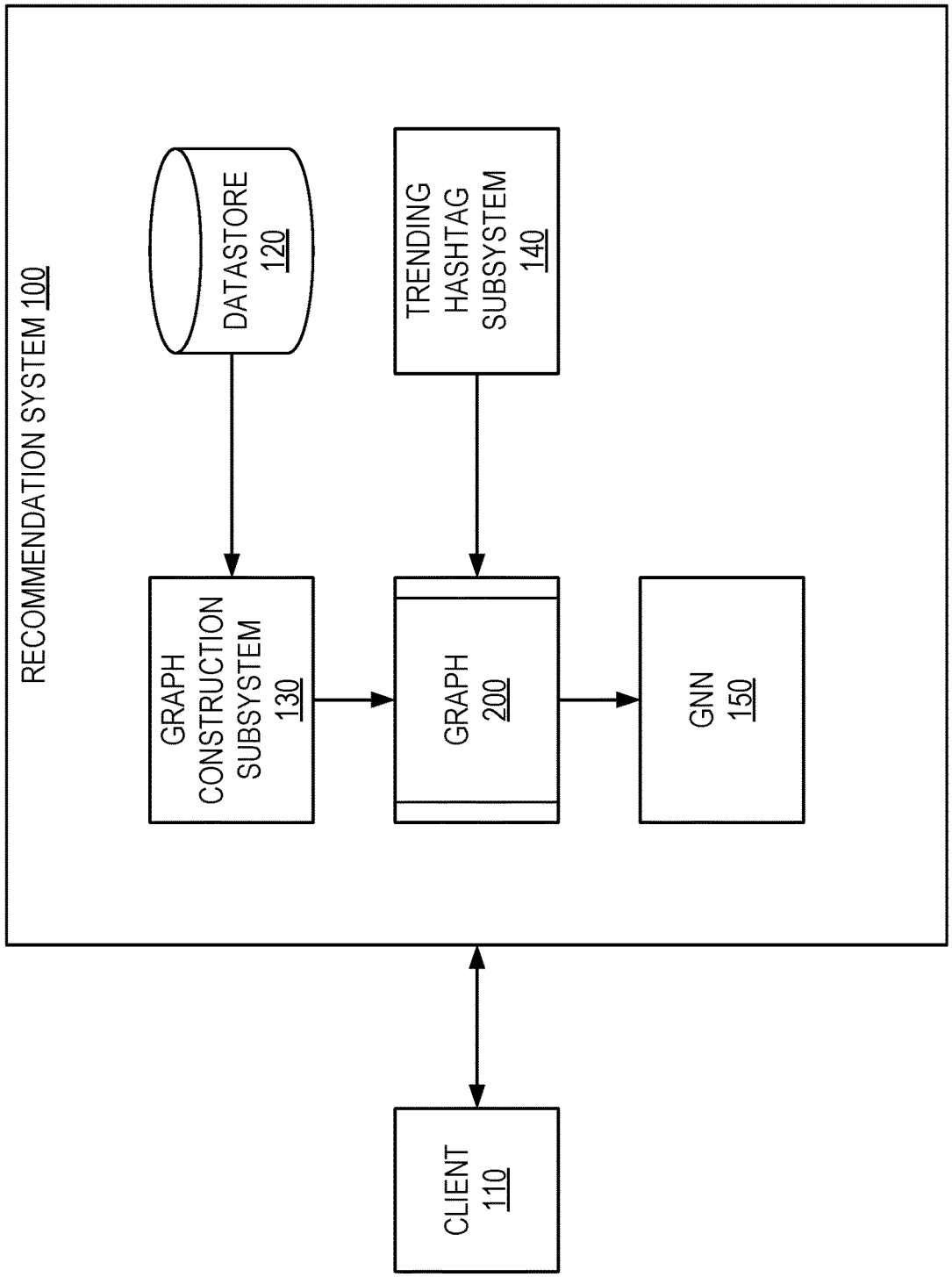
FIG. 1 is a diagram of an example of a recommendation system for recommending historical and trending hashtags, according to some embodiments described herein.

As described above, hashtags and trends can play an important role on a social media platform. Because of this, some systems use machine learning to automatically generate hashtags for content on social media. However, existing systems cannot keep up with rapid changes in trends and are often biased towards historically popular tags because of the lack of training on new or trending hashtags. When such existing systems miss trends, they potentially cause their users to miss out on opportunities for audience growth.

Some embodiments of a recommendation system described herein can recommend hashtags, including trending hashtags, for videos to be posted on social media platforms or elsewhere. An example of the recommendation system implements a multi-label prediction problem to recommend historical hashtags that have previously been identified as associated with certain videos and additionally implement a zero-shot learning problem to recommend trending hashtags not known to be associated with any videos in particular. More specifically, in some embodiments, the recommendation system constructs or otherwise accesses a graph representing relationships between videos and hashtags and adds to the graph nodes for trending hashtags. In various embodiments, when a new graph node for a trending hashtag is added to the graph, connections are made between the new graph node and graph nodes for historical hashtags to which the trending hashtag is deemed semantically similar. The recommendation system can then use a graph neural network (GNN) to predict, from the constructed graph, relationships between an input video and hashtags, including trending hashtags and historical hashtags represented by nodes in the graph, to recommend hashtags for the input video.

The following non-limiting example is provided to introduce certain embodiments. In this example, a recommendation system constructs a graph based on social media data in a datastore. The social media data includes indications of videos and historical hashtags and describes actual video tagging on one or more social media platforms. In the social media data, a historical hashtag is associated with a video if the historical hashtag is known to have been associated with the video when the video was posted on a social media platform. The graph includes video nodes representing videos in the social media data and historical hashtag nodes representing historical hashtags in the social media data. The recommendation system includes edges in the graph to represent relationships between videos and hashtags in the social media data. As used herein, references to videos in the datastore should be understood to mean video files or data about the video files that are stored in the datastore.

In this example, the recommendation system can update the graph as needed to incorporate trending hashtags (i.e., hashtags not known to be associated with any particular video in the datastore) as they are received by the recommendation system. Upon receiving indication of a trending hashtag, the recommendation system adds to the graph a trending hashtag node representing the trending hashtag. The recommendation system also adds to the graph one or more edges connecting the trending hashtag node to historical hashtag nodes representing historical hashtags that are semantically similar to the rending hashtag. The processing of a trending hashtag can be performed quickly, such as in real time or near-real time, because the recommendation system need not process any videos along with the trending hashtag.

A user can provide a new video to the recommendation system, for instance, if the user would like to post the new video on a social media platform. In this example, the recommendation system adds to the graph a new video node representing the new video. The recommendation system then provides the graph, including the new video node and also including one or more trending hashtag nodes, to a trained GNN configured to predict links, i.e., edges connecting video nodes or hashtag nodes. The GNN outputs an updated version of the graph, including edges connecting the new video node to one or more hashtag nodes. The recommendation system then outputs a recommendation for the video, where that recommendation includes the hashtags represented by the hashtag nodes to which the new video node is connected in the updated graph.

Certain embodiments described herein represent improvements in the technical fields of machine learning and hashtag recommendations. By dividing the problem into a multi-label prediction problem and a zero-shot learning problem, embodiments described herein can learn unseen hashtags in real time or near-real time to capitalize on bursts of activity related to trending hashtags. Certain embodiments described herein are able to learn compressed video representations in a latent space through an encoder architecture based on graph neural networks in addition to learning hashtag representations in the latent semantic space, including trending hashtags not known to be associated with any videos in the datastore. As a result, some embodiments can handle an open domain of trending hashtags, such can include proper names, slang, and newly minted terms, due to a lack of restriction to any particular dictionary. Thus, some embodiments provide an efficient, robust solution to hashtag recommendations by machine learning.

Overview of a Recommendation System

FIG. 1 is a diagram of an example of a recommendation system 100, according to some embodiments described herein. The recommendation system 100 may be configured to recommend hashtags, including trending hashtags, for tagging videos. In some embodiments, one or more clients 110 are configured to access the recommendation system 100. In that case, a client 110 can provide a video or indicate a location of the video to the recommendation system 100, which in turn may indicate one or more hashtags recommended for the video. An example of the recommendation system 100 includes a datastore 120, a graph construction subsystem 130, a trending hashtag subsystem 140, and a graph neural network 150. It should be understood that the various components of the recommendation system 100 may be remote from each other or under control of different parties. For example, the datastore 120 may be maintained by a third party and accessed by or configured to transmit data to the graph construction subsystem 130 via a data communications network (not shown).

In some embodiments, one or more clients 110 are in communication with the recommendation system 100 to receive recommendations of hashtags for videos indicated at such clients 110. A client 110 may be implemented as a computing device or portion of a computing device. For instance, a client 110 could be an application running on a computing device, where that application is used to post videos to one or more social media platforms. When a user of the client 110 indicates a video to the client 110, such as by uploading that video or indicating a location of the video, the client 110 may transmit the video or an indication of the location of the video to the recommendation system 100. For instance, the recommendation system 100 may be implemented as a computer server remote from the client 110. Upon receiving the video, either from the client 110 or from the location indicated by the client 110, the recommendation system 100 may process the video as described herein to provide one or more hashtags as recommendations for the video. The recommendation system 100 may transmit the hashtags back to the client 110. The client 110 may then automatically tag the video with the hashtags or may display the hashtags to the user, thus enabling the user to select which hashtags to use in tagging the video when posting the video, or after the video is posted, on the social media platform.

The datastore 120 may maintain or have access to videos and hashtags. In one example, the datastore 120 may be a storage device or a portion of a storage device, or the datastore may be or include one or more database tables. In some embodiments, prior to operation of the recommendation system 100, an automated service scraped videos and hashtags from one or more social media platforms and stored the videos and hashtags in the datastore 120. For example, the datastore 120 may include videos (or data about videos) and hashtags that were posted to or used on one or more social media platforms, such as Facebook, YouTube, Instagram, Twitter, or others. The datastore 120 may maintain associations between videos and hashtags from the social media platforms. For instance, a first video was tagged with a set of hashtags on a social medial platform, and thus, the datastore 120 maintains an association between the first video and the set of hashtags. In this disclosure, a hashtag that is known, in the datastore 120, to have been associated with at least one video that was posted on a social media platform is referred to as a "historical hashtag." This is in contrast with a "trending hashtag," which need not have a known association with any given video in the datastore 120. As described below in detail, the recommendation system 100 can use videos and historical hashtags from the datastore 120 to construct an initial graph 200 that can later be augmented with trending hashtags.

The graph construction subsystem 130 may construct a graph 200 from the videos and historical hashtags in the datastore 120, where that graph 200 can later be used as input to the GNN 150. In some embodiments, the graph 200 includes nodes and edges, where the nodes represent videos and hashtags and the edges represent relationships between videos and hashtags.

Figure 2:
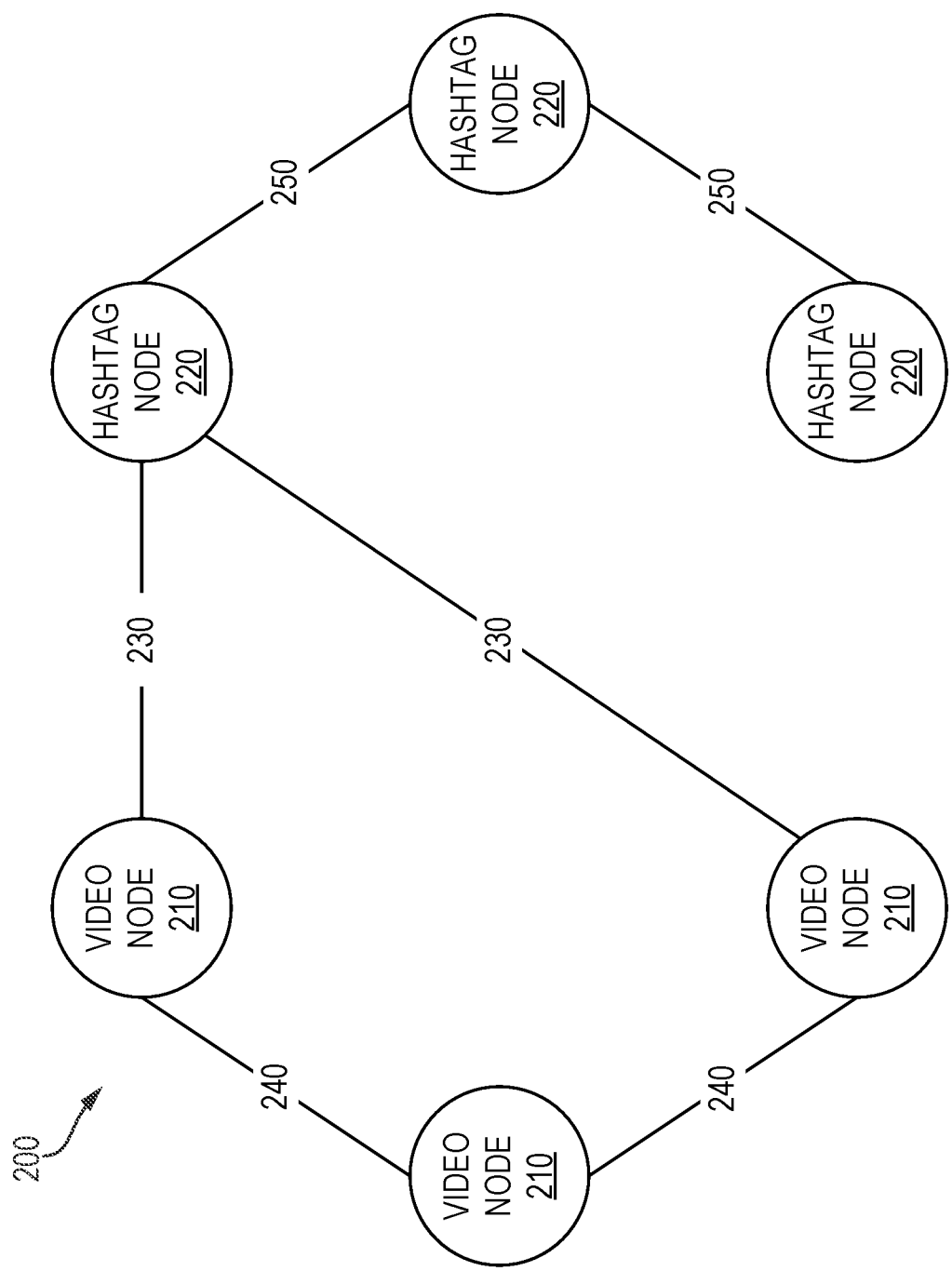
FIG. 2 illustrates an example graph that could be constructed by a graph construction subsystem of the recommendation system, according to some embodiments described herein.

FIG. 2 illustrates an example graph 200 that could be constructed by the graph construction subsystem 130, according to some embodiments described herein. As shown, in FIG. 2, the graph 200 includes nodes, such as video nodes 210 and hashtag nodes 220, as well as edges, such as video-to-hashtag (V2H) edges 230, video-to-video (V2V) edges 240, and hashtag-to-hashtag (H2H) edges 250. Although the graph 200 shown includes only six nodes, a graph 200 could include hundreds or thousands of nodes. Each node represents a corresponding video or hashtag and may be stored as a data structure that includes data describing the corresponding video or a hashtag. For instance, a video node 210 could include features of a corresponding video, and a hashtag node 220 could include an embedding of a corresponding hashtag. In this context, an embedding of a hashtag is a vector representation of the hashtag.

Each edge of the graph 200 directly connects one node to another node. The edges may include a combination of the following: (1) V2H edges 230 connecting video nodes 210 to hashtag nodes 220 and thus indicating relationships between corresponding videos and hashtags; (2) V2V edges 240 connecting video nodes 210 to other video nodes 210 and thus indicating relationships between videos and other videos, and (3) H2H edges 250 connecting hashtag nodes 220 to other hashtag nodes 220 and thus indicating relationships between hashtags and other hashtags. In some examples, a V2H edge 230 between a video node 210 and a hashtag node 220 indicates that the hashtag corresponding to the hashtag node 220 is associated with the video corresponding to the video node 210, such as by having been used to tag the video or having been used to tag another video having similar content to the video, as indicated by data in the datastore 120. In some examples, a V2V edge 240 between a first video node 210 and a second video node 210 indicates that a first video corresponding to the first video node 210 shares one or more hashtags with a second video corresponding to the second video node 210, or with another video deemed to have similar content to the second video, as indicated by data in the datastore 120. In some examples, an H2H edge 250 between a first hashtag node 220 and a second hashtag node 220 indicates that first and second hashtags corresponding to the first and second hashtag nodes 220 were both used as tags for a given video, or were used as tags for separate videos deemed to have shared content, as indicated by data in the datastore 120. In some embodiments, the edges are weighted to indicate the strength of such relationships, as described further below, but that need not be the case. Construction of the graph 200 will be described in more detail later in this disclosure.

Referring back to FIG. 1, in some embodiments, the trending hashtag subsystem 140 identifies trending hashtags and adds to the graph 200 hashtag nodes 220 representing trending hashtags. For instance, in some embodiments, the trending hashtag subsystem 140 has access to an application programming interface (API) for accessing a system that stores data related to one or more social media platforms; the trending hashtag subsystem 140 is or uses an automated service for periodically checking one or more social media platforms for hashtags; or the trending hashtag subsystem 140 is otherwise configured to access or receive a stream of hashtags used on one or more social media platforms. Various implementations are possible and are within the scope of this disclosure. Upon receiving indication of a trending hashtag (i.e., a hashtag not known to be associated with a video according to data stored in the datastore 120), the trending hashtag subsystem 140 may generate a hashtag node 220 to represent the trending hashtag and may add the hashtag node 220 to the graph. The trending hashtag subsystem 140 may also add to the graph a respective edge between the hashtag node 220 and each other hashtag node 220 representing a hashtag deemed semantically similar to the trending hashtag, as will be described in more detail below.

Figure 3:
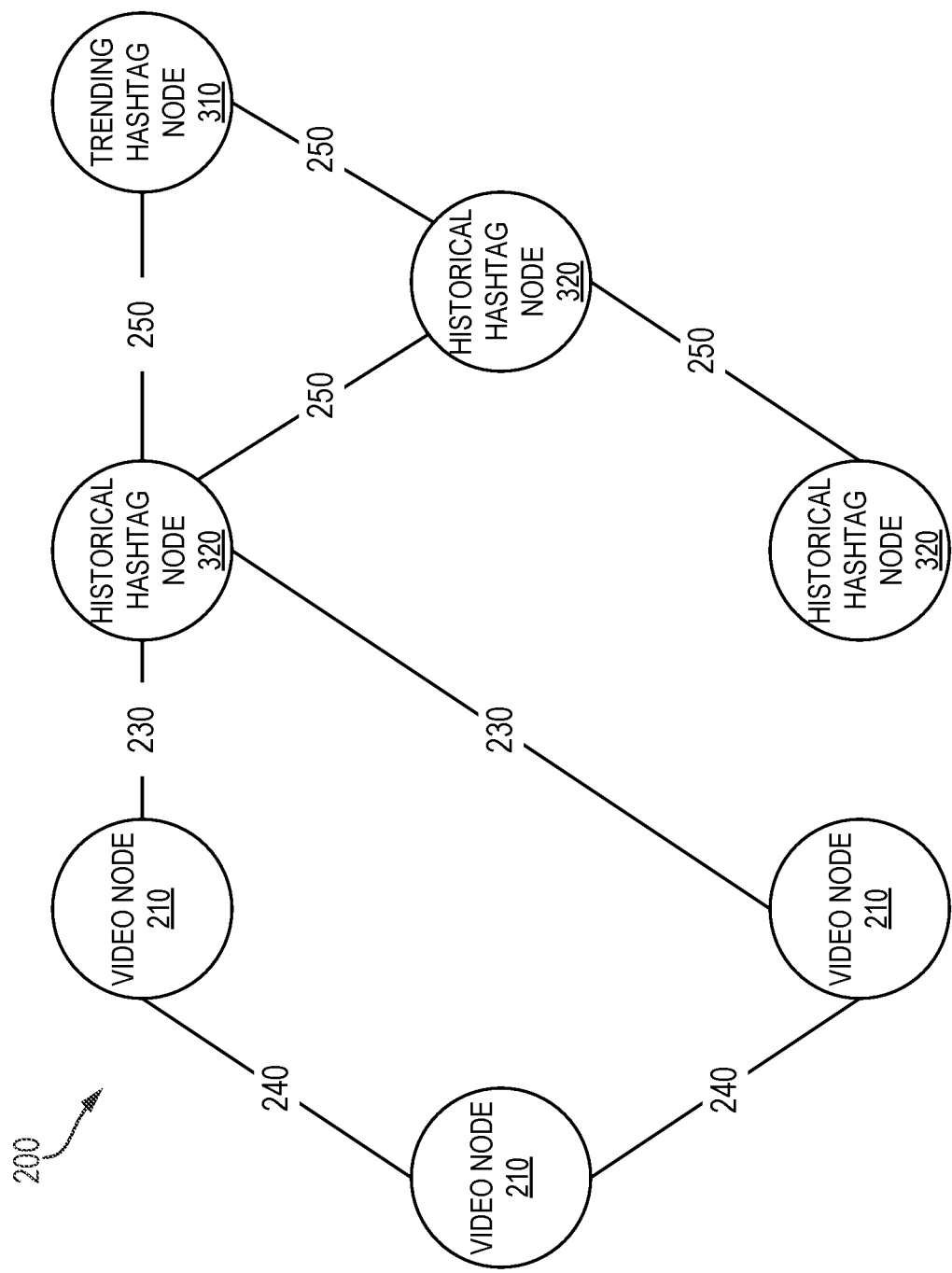
FIG. 3 illustrates an example of a graph updated to include a trending hashtag node representing a trending hashtag, according to some embodiments described herein.

FIG. 3 illustrates an example of a graph 200 updated to include a trending hashtag node 310 representing a trending hashtag, according to some embodiments described herein. Specifically, FIG. 3 illustrates an updated version of the graph 200 of FIG. 2, with the addition of the trending hashtag node 310. In FIG. 3, the graph 200 includes hashtag nodes 220 that include historical hashtag nodes 320 as well as trending hashtag nodes 310. In some embodiments, a historical hashtag node 320 represents a historical hashtag having a known association with at least one video in the datastore 120, and a trending hashtag node 310 represents a trending hashtag not known to be associated with any video in the datastore 120. Thus, as described above, the graph construction subsystem 130 may initially build the graph 200 to include video nodes 210, historical hashtag nodes 320, and edges (e.g., a combination of V2H edges 230, V2V edges 240, and H2H edges 250), and the trending hashtag subsystem 140 may add trending hashtag nodes 310 upon identifying trending hashtags not yet included in the graph 200. The graph 200 may continue to grow as new trending hashtags are discovered and corresponding trending hashtag nodes 310 are added, or in some embodiments, trending hashtags nodes 310 may be pruned from the graph from time to time.

Referring back to FIG. 1, upon receiving an indication of a new video for which hashtag recommendations are sought, the recommendation system 100 may utilize the GNN 150 to determine hashtag recommendations for the video. The GNN 150 may be, for example, a graph convolution network (GCN) or a graph attention network (GAT), either of which may be a neural network configured to operate on a graph. In some embodiments, the GNN 150 has been previously trained, as described in detail below, to predict links (i.e., edges) between nodes of graphs. The links represent relationships among videos and hashtags. The recommendation system 100 may construct a new video node 210 in the graph 200 to represent the new video. The recommendation system 100 may then input the graph 200, including the new video node 210, into the GNN 150. The GNN 150 may thus output an updated graph 200 that includes one or more new edges connecting the new video node 210 to other nodes.

Figure 4:
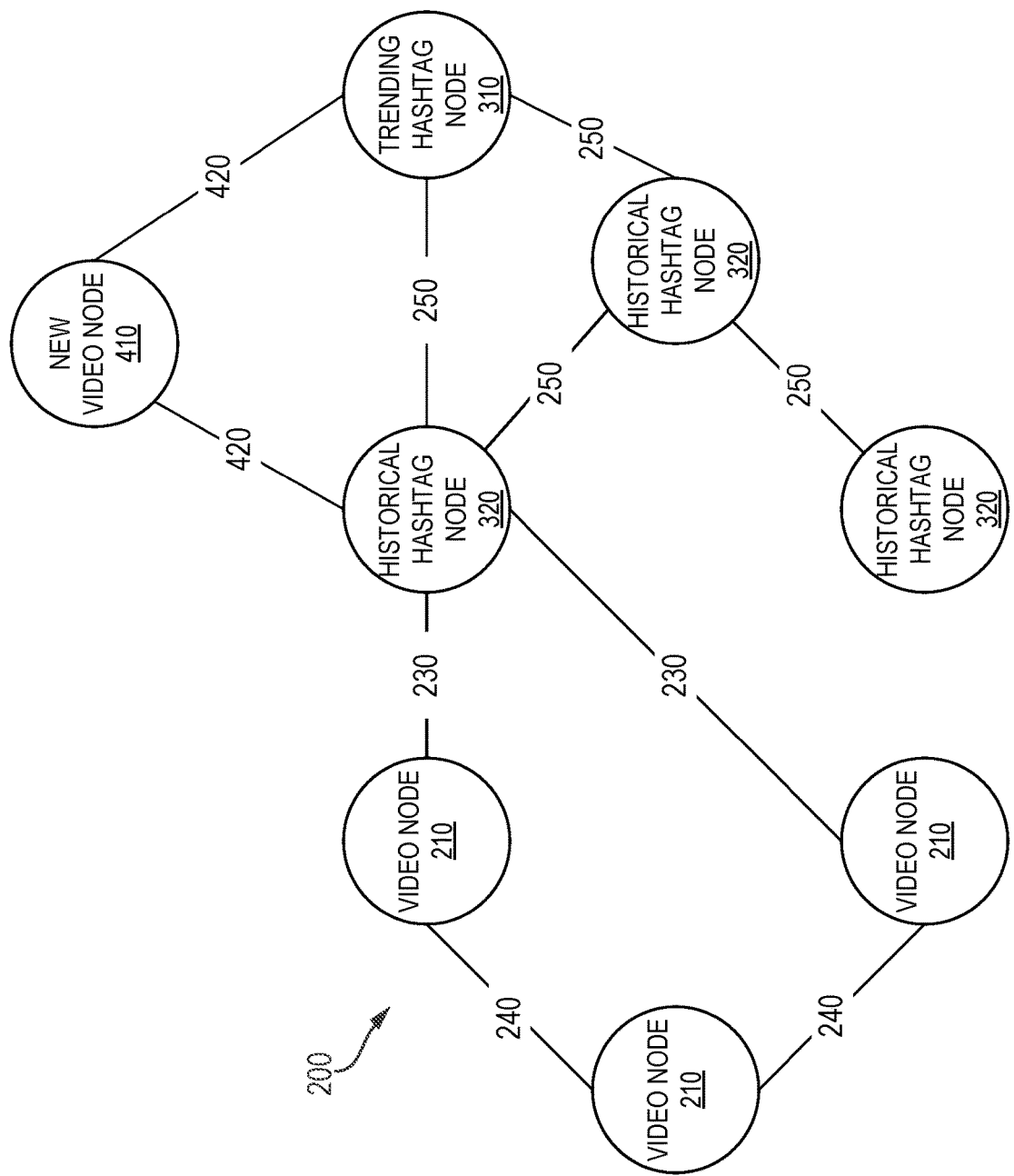
FIG. 4 illustrates an example of a graph output by a graph neural network of the recommendation system, according to some embodiments described herein.

FIG. 4 illustrates an example of a graph 200 output by the GNN 150, according to some embodiments described herein. Specifically, FIG. 4 illustrates an updated version of the graph 200 of FIG. 3, with the addition of a new video node 410 representing a new video and, further, with the addition of new edges 420 as determined by the GNN 150 in this example. In the embodiment shown in FIG. 4, the recommendation system 100 ignores the V2V edges 240 for the new video node 410 because the V2V edges 240 lead to other video nodes 210 rather than to hashtag nodes 220, and the embodiment of the recommendation system 100 seeks to predict hashtags rather than videos for the new video. The new V2H edges 420 connected to the new video node 410, however, may represent predictions of appropriate hashtags for the new video.

The V2H edges 420 may directly connect the new video node 410 to one or more historical hashtag nodes 320, trending hashtag nodes 310, or a combination of both. The recommendation system 100 may output as a recommendation one or more of the hashtags represented by historical hashtag node(s) 320 and trending hashtag node(s) 310 adjacent to (i.e., directly connected to) the new video node 410 by way of the new V2H edges 420. As shown in FIG. 4, the new video node 410 is adjacent to one historical hashtag node 320 and one trending hashtag node 310, but links directly connecting the new video node 410 to additional historical hashtag nodes 320 and/or other trending hashtag node 310 are possible. Thus, the recommended hashtags may include historical hashtags, trending hashtags, or a combination of both.

Example Operations of a Recommendation System

Figure 5:
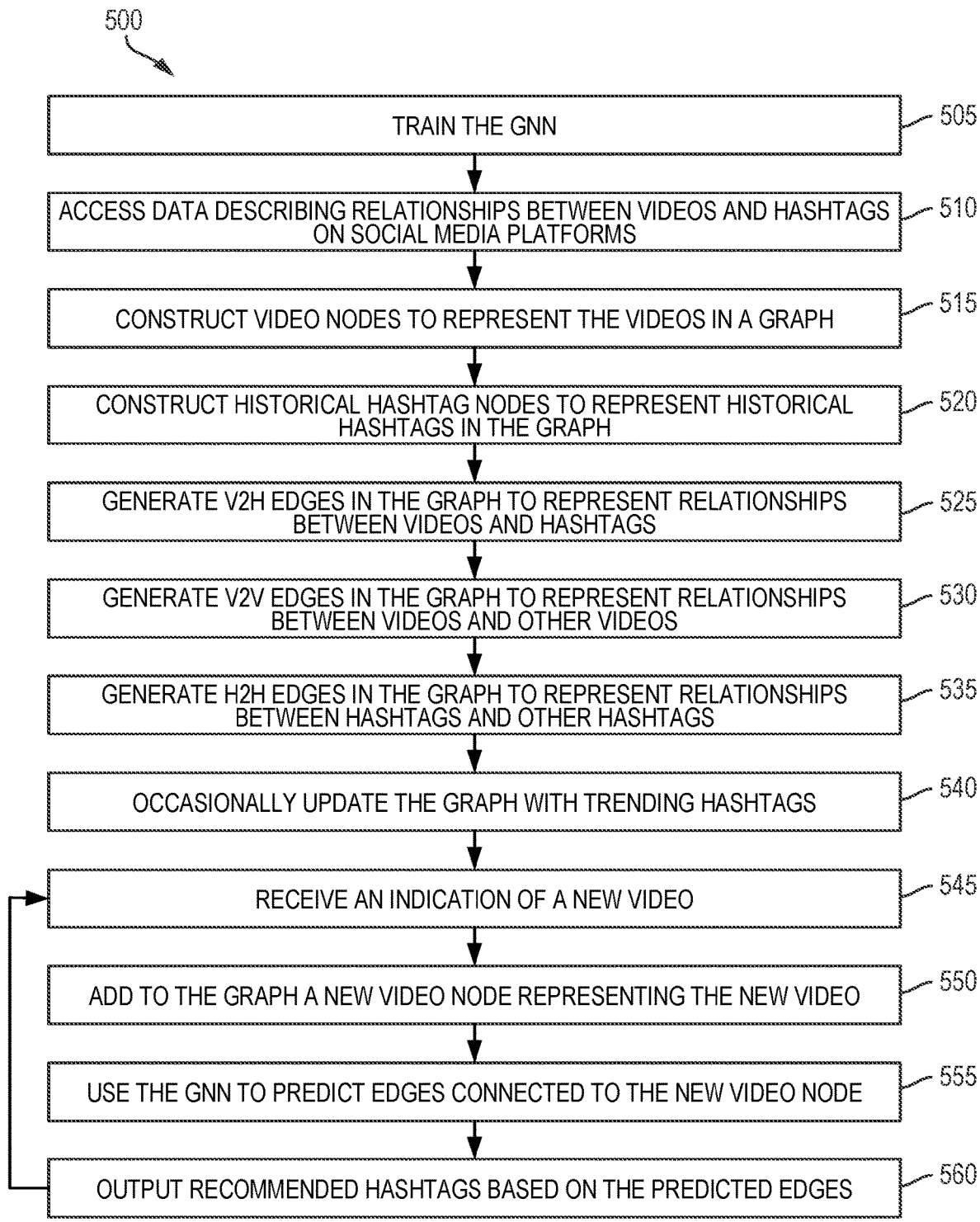
FIG. 5 is a flow diagram of an example of a process for recommending hashtags for a video, according to some embodiments described herein.

FIG. 5 is a flow diagram of an example of a process 500 for recommending hashtags for a video, according to some embodiments described herein. In some embodiments, the recommendation system 100 performs this process 500 or similar to recommend hashtags for a video. The process 500 depicted in FIG. 5 may be implemented in software executed by one or more processing units of a computing system, implemented in hardware, or implemented as a combination of software and hardware. This process 500 is intended to be illustrative and non-limiting. Although FIG. 5 depicts various processing operations occurring in a particular order, the particular order depicted is not required. In certain alternative embodiments, the processing may be performed in a different order, some operations may be performed in parallel, or operations may be added, removed, or combined together.

As shown in FIG. 5, at block 505, the process 500 involves training the GNN 150. This training operation may be an initialization activity and need not be performed more than once for the GNN 150, or this training operation may be performed as needed to refine the GNN 150. In some embodiments, the GNN 150 is trained by the recommendation system 100, or the GNN 150 may be trained outside the recommendation system 100, such as by a third party, and then utilized by the recommendation system 100 after training. Activities involved in training the GNN 150 in some embodiments are described in more detail later in this disclosure.

At block 510, the process 500 involves accessing data describing relationships between videos and hashtags on one or more social media platforms. For instance, such data may be scraped from the one or more social media platforms, such as by a bot, and stored in the datastore 120 for access by the recommendation system 100. As such, the datastore 120 may maintain videos, hashtags, and associations between videos and hashtags, associations between videos, and associations between hashtags. For example, an association between a video and a hashtag may indicate that the hashtag was used to tag the video on at least one social media platform. In some embodiments, the datastore 120 also includes an indication of how many times each hashtag was used for each video. Other data about hashtags, videos, and their various associations may also be included in the datastore 120. Such other data may include, for example, data about when and where and by which account a video was posted.

Given the data in the datastore 120, the graph construction subsystem 130 of the recommendation system 100 may construct a graph 200 representing relationships between videos and hashtags. Graph construction may be performed as an initialization activity and then one or more times in an asynchronous manner, such as in parallel to other operations such as adding trending hashtag nodes and recommending hashtags. To construct the graph 200, at block 515, the process 500 involves constructing video nodes 210 of the graph 200. Each video node 210 may be a data structure including video features (i.e., features of the video) describing the corresponding video represented by the video node 210. To construct a video node 210, the graph construction subsystem 130 may extract features from the corresponding video or derive features from corresponding video data in the datastore 120.

Various techniques are possible for extracting features from a video. In some embodiments, the graph construction subsystem 130 extracts frame-level features from the video using a neural network such as a deep convolutional neural network. Specifically, for example, the graph construction subsystem 130 uses the publicly available 20 Reset-152 trained on ImageNet. The graph construction subsystem 130 decodes the video, if needed, and extracts z representative frames, which may be at equally spaced intervals in the video. The graph construction subsystem 130 passes the frames through the neural network and fetches the ReLu activation of the last hidden layer prior to a final classification layer. In that case, the output is a set of video features in the form of a 2048×z-dimensional feature vector representing the video. The graph construction subsystem 130 may construct such a feature vector to be included in a respective video node for each video represented in the datastore 120.

At block 520, the process 500 involves constructing historical hashtag nodes 320 for the graph 200. In some embodiments, the graph construction subsystem 130 constructs a historical hashtag node 320 for each hashtag represented in the datastore 120. Each historical hashtag node 320 may include data representing a corresponding historical hashtag. For instance, a historical hashtag node 320 may be, or may include, an embedding of the historical hashtag.

Various embedding techniques are possible and are within the scope of this disclosure. In some embodiments, given a hashtag, the graph construction subsystem 130 determines whether the hashtag includes multiple words and, if so, segments the hashtag into two or more words. For instance, the graph construction subsystem 130 uses the Viterbi algorithm to segment the hashtag. The graph construction subsystem 130 could, for example, split the hashtag "autodetailing" into the words "auto" and "detailing" and could split the hashtag "pes2019mobile" into the words "pes," "2019," and "mobile." After segmenting a hashtag into words, the graph construction subsystem 130 may then determine an embedding for the hashtag as a function of the respective embeddings of the words making up the historical hashtag. More specifically, for instance, each embedding may be a numerical vector, and the graph construction subsystem 130 may combine the embeddings of each word (e.g., by taking the average) in the hashtag and may use the result as the embedding for the hashtag as a whole. For each historical hashtag, the graph construction subsystem 130 may compute such an embedding to use as a corresponding historical hashtag node 320.

At block 525, the process 500 involves generating V2H edges 230 in the graph 200 to connect video nodes 210 constructed at block 515 to historical hashtag nodes 320 constructed at block 520. In some embodiments, the graph construction subsystem 130 adds a V2H edge 230 between a video node 210 representing a video and a historical hashtag node 320 representing a historical hashtag when the historical hashtag was used to tag the video at least a first threshold number of times. The first threshold may be expressed, for example, as a percentage of the total number of hashtags represented in the datastore 120 or as an absolute quantity. For instance, if the first threshold is a quantity of 1, then any association between the video and the historical hashtag would cause the graph construction subsystem 130 to generate the V2H edge 230. If the graph 200 includes weighted edges, then each V2H edge 240 may be weighted, for example, as a function of the number of times the historical hashtag was used to tag the video according to data in the datastore 120.

At block 530, the process 500 involves generating V2V edges 240 in the graph 200 to connect pairs of video nodes 210 constructed at block 515. In some embodiments, the graph construction subsystem 130 adds a V2V edge 240 between a first video node 210 representing a first video and a second video node 210 representing a second video when the first video and the second video have at least a second threshold number of historical hashtags in common according to the datastore 120. The second threshold can, but need not, be the same as the first threshold. The second threshold may be expressed, for example, as a percentage of the total number of hashtags represented in the datastore 120, as a percentage of the total number pf hashtags used to tag the first and second videos, or as an absolute quantity. For instance, if the second threshold is a quantity of 1, then the existence of any historical hashtag used to tag both the first video and the second video would cause the graph construction subsystem 130 to generate the V2V edge 240. If the graph 200 includes weighted edges, then each V2V edge 240 may be weighted, for example, as a function of the number of hashtags in common between the first video and the second video according to data in the datastore 120.

At block 535, the process 500 involves generating H2H edges 250 in the graph 200 to connect pairs of historical hashtag nodes 320 constructed at block 520. In some embodiments, the graph construction subsystem 130 adds an H2H edge 250 between a first historical hashtag node 320 representing a first historical hashtag and a second historical hashtag node 320 representing a second historical hashtag when one or both of the following are true: (1) the first historical hashtag and the second historical hashtag have at least a third threshold number of videos in common according to the datastore 120; or (2) the first and second historical hashtags are deemed semantically similar. The third threshold can, but need not, be the same as the first threshold or the second threshold. The third threshold may be expressed, for example, as a percentage of the total number of videos represented in the datastore 120, as a percentage of the total number videos tagged with either the first and second historical hashtags, or as an absolute quantity. For instance, if the third threshold is a quantity of 1, then the existence of any video tagged by both the first historical hashtag and the second historical hashtag would cause the graph construction subsystem 130 to generate the H2H edge 250.

When determining semantic similarity, the graph construction subsystem 130 may determine that a first historical hashtag and a second historical hashtag are semantically similar if the distance (e.g., the cosine distance) between their respective embeddings is below a threshold. The embedding of each historical hashtags may be computed as described above, by segmenting the historical hashtag into words and then combining (e.g., averaging) the embeddings of the respective words of the historical hashtag. The graph construction subsystem 130 may generate an H2H edge 250 between each pair of historical hashtag nodes 320 for which the above criteria are met. If the graph 200 includes weighted edges, then each H2H edge 240 may be weighted, for example, as a function of one or both of (1) the number of videos in common between the first historical hashtag and the second historical hashtag according to data in the datastore 120 and (2) the distance between the respective embeddings of the first historical hashtag and the second historical hashtag.

The above operations for constructing the graph 200 may be performed during initialization of the recommendation system 100. These operations need not be repeated, unless refinement of the graph 200 is desired, such as if users indicate that the recommendations output by the recommendation system 100 are undesirable. In that case, the recommendation system 100 or an administrator may collect additional videos and historical hashtags to potentially build a graph 200 that better reflects the use of hashtags on social medial platforms.

At block 540, the process 500 involves occasionally updating the graph 200 to incorporate trending hashtags. Although this operation is shown at block 540 for simplicity, updating the graph 200 to incorporate trending hashtags may be an asynchronous process performed in parallel with the below blocks 545-560 of this process 500. For instance, the graph may be updated with trending hashtags once or multiple times after the initial construction of the graph 200 as described above. Activities involved in updating the graph 200 to incorporate trending hashtags are described in more detail below with reference to FIG. 6.

At block 545 of FIG. 5, the process 500 involves receiving an indication of a new video for which a recommendation of hashtags is sought. For instance, the new video may be received from a client 110 being operated by a user. The user may be in the process of posting the new video on a social media platform.

At block 550, the process 500 involves adding a new video node 410 to the graph 200 to represent the new video. To this end, the graph construction subsystem 130 can extract features from the new video and thereby create the new video node 410.

At block 555, the process 500 involves using the GNN 150 to predict edges connected to the new video node 410. In some embodiments, the recommendation system 100 provides the graph 200, including the new video node 410, as input to the GNN 150. Based on the graph 200, the GNN 150 outputs an updated graph 200 including new edges that have been predicted for the new video node 410. The new edges may include new V2V edges 240 and new V2H edges 230 (e.g., new V2H edges 420 shown in FIG. 4) connected to the new video node 410. As mentioned, new V2V edges 240 may be ignored in some embodiments.

At block 560, the recommendation system 100 outputs a set of hashtags, which may include a combination of historical hashtags and trending hashtags. In some embodiments, because the graph 200 was updated with trending hashtags at block 540, the graph includes one or more trending hashtag nodes 310 in addition to the historical hashtag nodes 320 constructed at block 520. Thus, the new V2H edges 230, such as those shown in FIG. 4, predicted at block 555 could connect the new video node 410 to one or more historical hashtag nodes 320, trending hashtag nodes 310, or both. In some embodiments, the recommendation system 100 outputs as a recommendation each hashtag corresponding to a hashtag node 220 connected to the new video node 410 via a respective new V2H edge 230. Additionally or alternatively, if the graph 200 includes weighted edges, then the new V2H edges 230 connected to the new video node 410 may also be weighted; in that case, the recommendation system 100 may output as a recommendation each hashtag corresponding to a hashtag node 220 connected to the new video node 410 via a respective new V2H edge 230 having at least a threshold weight. The recommendation may include one or more historical hashtags, trending hashtags, or both The recommendation system 100 may perform the operations of block 545-560 for each new video received at the recommendation system 100. Thus, the recommendation system 100 may recommend hashtags, including trending hashtags, historical hashtags, or both, as applicable, for each such new video.

Example of Incorporating Trending Hashtags

Figure 6:
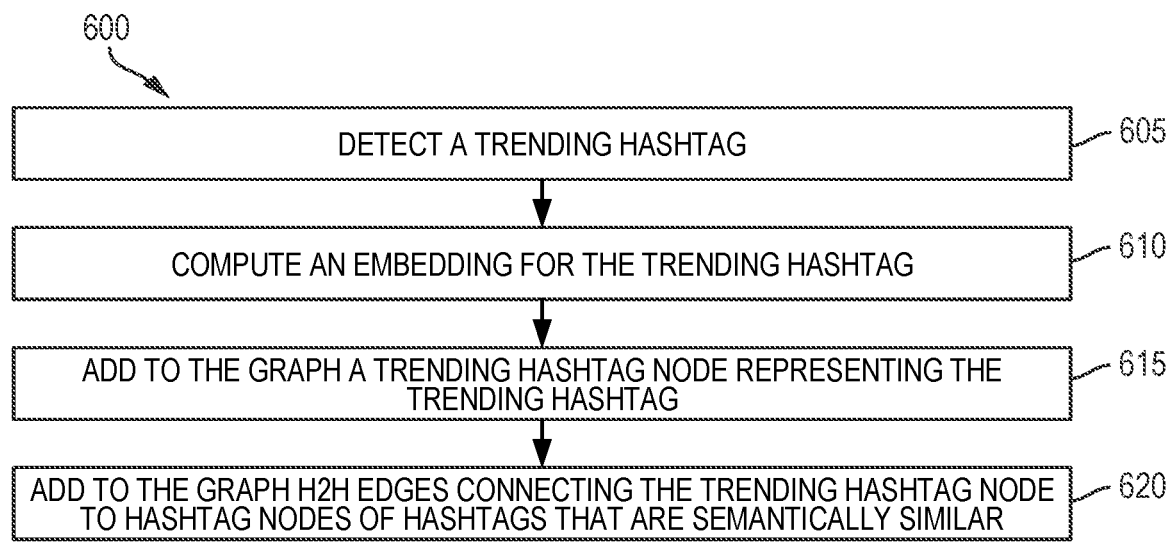
FIG. 6 is a flow diagram of an example of a process for updating a graph with a trending hashtag, according to some embodiments described herein.

FIG. 6 is a flow diagram of an example of a process 600 for updating the graph 200 with a trending hashtag, according to some embodiments described herein. The trending hashtag subsystem 140 may perform this process 600 or a similar process at block 540 of the above process 500 and, in some cases, in parallel with blocks 545-560 of the above process 500. Further, the trending hashtag subsystem 140 may perform this process 600 periodically (e.g., once per hour) or on demand each time one or more new trending hashtags are detected in a data stream received from one or more social media platforms or other services.

The process 600 depicted in FIG. 6 may be implemented in software executed by one or more processing units of a computing system, implemented in hardware, or implemented as a combination of software and hardware. This process 600 is intended to be illustrative and non-limiting. Although FIG. 6 depicts various processing operations occurring in a particular order, the particular order depicted is not required. In certain alternative embodiments, the processing may be performed in a different order, some operations may be performed in parallel, or operations may be added, removed, or combined together.

As shown in FIG. 6, at block 605, the process 600 involves detecting a trending hashtag. For instance, the trending hashtag subsystem 140 may receive a data stream from one or more social media platforms and may thus identify each hashtag not already stored in the datastore 120 as associated with a video. The trending hashtag subsystem 140 may deem each such hashtag to be a trending hashtag.

At block 610, the process 600 involves computing an embedding for the trending hashtag detected at block 605. In some embodiments, the trending hashtag subsystem 140 computes the embedding as described above. In other words, the trending hashtag subsystem 140 segments the trending hashtag into one or more words, if applicable, and determines the respective embedding of each word of the hashtag. The trending hashtag subsystem 140 then computes the embedding of the trending hashtag as a combination of the respective embeddings of the words of the trending hashtag.

At block 615, the process 600 involves adding a trending hashtag node 310 to the graph 200 to represent the trending hashtag. For instance, the trending hashtag node 310 may be or include the embedding computed for the trending hashtag at block 610.

At block 620, the process 600 involves adding one or more H2H edges 250 to connect the trending hashtag node 310 to one or more other hashtag nodes 220. In some embodiments, the trending hashtag subsystem 140 connects the trending hashtag node 310 to hashtag nodes 220 of hashtags deemed semantically similar to the trending hashtag. Various techniques exist for determining semantic similarity, and the trending hashtag subsystem 140 may use one or more of such techniques.

In some embodiments, the trending hashtag subsystem 140 selects, as semantically similar, the top k nearest neighbors to the trending hashtag. As described above, the recommendation system 100 previously determined respective embeddings for each historical hashtag, and the trending hashtag subsystem 140 would have determined embeddings for trending hashtags previously incorporated into the graph 200. Thus, the trending hashtag subsystem 140 can compare the embedding computed at block 610 to the embeddings of other hashtags incorporated in the graph 200. In some embodiments, the trending hashtag subsystem 140 selects the k other hashtags that have the smallest distance (e.g., the smallest cosine distance) to the embedding of the trending hashtag as the top k nearest neighbors to the trending hashtag. The trending hashtag subsystem 140 may connect the trending hashtag node 310 to the hashtag nodes 220 representing each of such top k nearest neighbors via H2H edges.

As discussed above, the trending hashtag subsystem 140 may perform this process 600 for each detected trending hashtag. Thus, the graph 200 may remain updated with trending hashtag nodes 310 representing those trending hashtags in real time or near-real time. New trending hashtags can be received one-by-one as they become available or may be received in batches. When multiple new trending hashtags are received, the process 600 may be performed sequentially for each new trending hashtag or multiple instances of the process 600 may be performed in parallel to add the new trending hashtags to the graph 200.

Example of a Graph Neural Network

As discussed in detail above, the recommendation system 100 may include a GNN 150, which may be trained to predict links (i.e., edges) in graphs 200 so as to connect a new video node 410 to one or more hashtag nodes 220. The GNN 150 may be, for example, a GCN or a GAT, but other graph-based neural network architectures may be used in some embodiments. Below describes an example of an architecture of the GNN 150. This example is provided for illustrative purposes only and does not limit the various embodiments of this disclosure.

In some embodiments, particularly when the GNN 150 is a GCN, each network node of the GNN performs a convolution to iteratively learn a latent network node embedding. The network node state update scheme in the GCN can be as follows:

$$\vec{x}'_i = \sigma\left(\sum_{j \in ne(i)} \frac{1}{c_{ij}} W^{(l)} \vec{x}_j^{(l)}\right)$$

In the above, $x_i$ is the feature vector for the $i^{th}$ node of the graph 200 (e.g., video nodes 210 and hashtag nodes 220); $c_{ij}$ is a normalizing constant for the edge (i,j) (e.g., V2H edges 230, V2V edges 240, and H2H edges 250); $W^{(l)}$ is the weight corresponding to the layer l; σ is a non-linearity; and ne(i) refers to the neighbors of the node i of the graph 200. An example of the GNN 150 sums messages passed from each node of the graph j∈ne(i). The GNN 150 repeats this operation for convolution operations involving the V2V edges 240, convolutions involving the H2H edges 250, and convolutions involving the V2H edges 230. In some embodiments, the GNN 150 performs convolutions within the set of video nodes 210 and within the set of hashtag nodes 220 independently. These initial convolution operations are accompanied by a reduction in latent dimension to 256 dimensions each. The GNN 150 then concatenates the results of the independent convolutions to perform joint convolutions between both sets of video nodes 210 and hashtag nodes 220. The resulting embedding passes through a softmax layer to obtain a set of recommended hashtags.

These operations can enable the GNN 150 to build a rich model of relationships and to learn joint representations of video and hashtag embeddings. Generally, in some embodiments, a joint representation is a by-product of video-hashtag convolution. Joint representations can be used to compare two different social media posts, each being a combination of video and hashtags.

In some embodiments, the GNN 150 is a GAT that applies, for example, a multi-head attention mechanism. In that case, an example of the update step involves multi-head attention weights from K independent attention mechanisms given by $a_{ij}^k$, after which the concatenation is replaced by averaging. In that case, the below update formula may be used instead of the above:

$$\vec{x}_i' = \sigma\left(\frac{1}{K}\sum_{k=1}^{K}\sum_{j\in ne(i)} a_{ij}^k W^k \vec{x}_j^{(l)}\right)$$

It should be noted that the k in the above formula need not be the same as the k used to determine semantic similarity for a trending hashtag.

Various techniques can be used to train the GNN 150. Typically, curating and creating labeled datasets for supervised learning is expensive. Thus, in some embodiments, the GNN 150 is trained using a framework of weak supervision or noisy labels. To train the GNN 150, the recommendation system 100 or a third party may mine trending hashtags from one or more social media platforms and, further, may extract numerous additional hashtags associated with videos to act as historical hashtags. Together, the videos, trending hashtags, and historical hashtags may be used to train the GNN 150. Some embodiments additionally generate a smaller dataset for testing purposes.

Example of a Computing System for Implementing a Recommendation System

Figure 7:
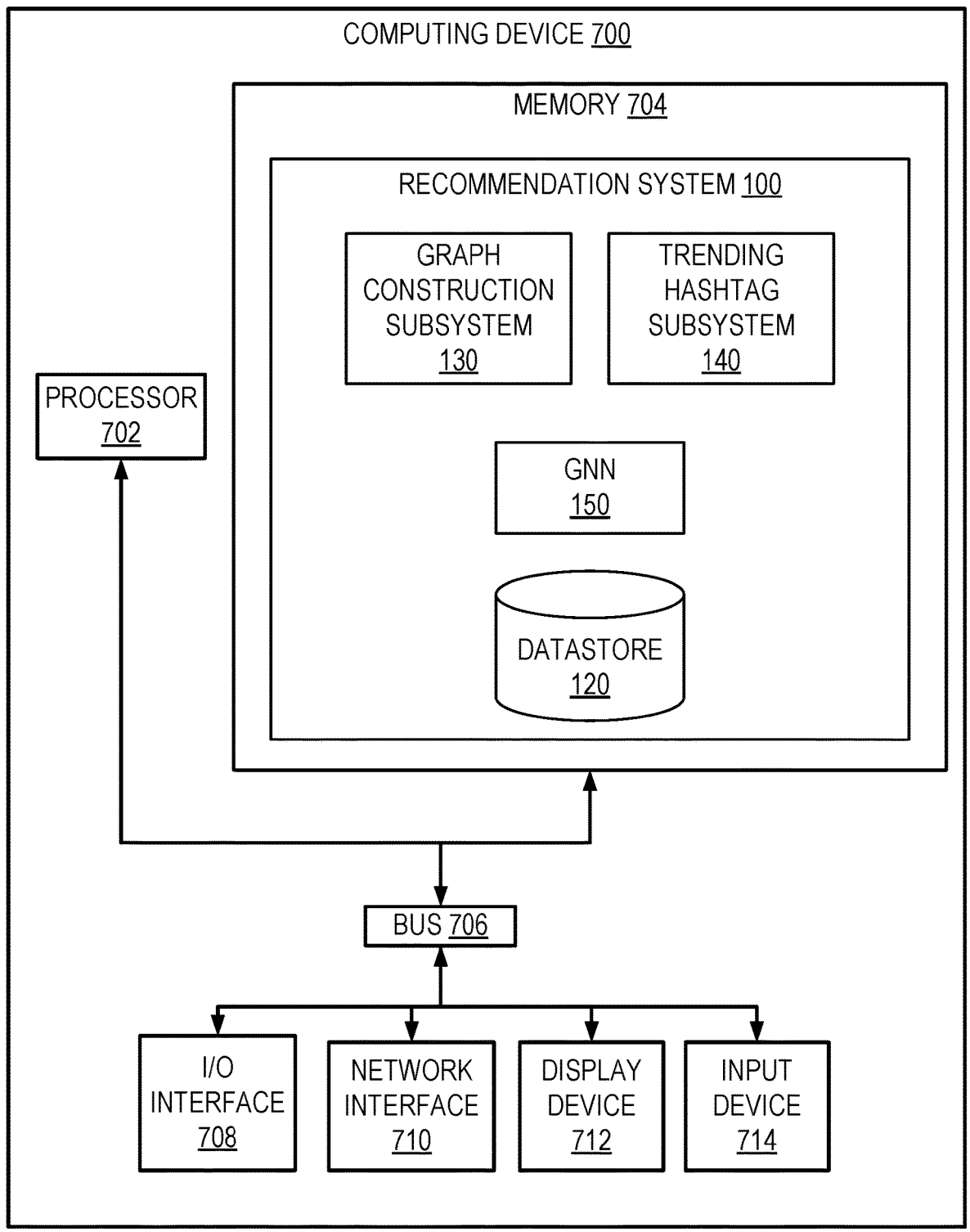
FIG. 7 is a diagram of an example of a computing system for performing certain operations described herein, according to some embodiments.

FIG. 7 is a diagram of an example of a computing system 700 for performing certain operations described herein, according to some embodiments. A suitable computing system or group of computing systems can be used for performing the operations described herein. For example, FIG. 7 depicts an example of a computing system 700 that can be used to execute the recommendation system 100, including the graph construction subsystem 130, the trending hashtag subsystem 140, and the GNN 150, or various other aspects described herein. In some embodiments, as shown for instance, the computing system 700 executes the recommendation system 100, and an additional computing system having devices similar to those depicted in FIG. 7 (e.g., a processor, a memory, etc.) trains the GNN 150 prior to its use as part of the recommendation system 100. In that case, the GNN 150 may be copied into the recommendation system 100 after training is complete. In other embodiments, however, the computing system 700 both trains the GNN 150 and executes the recommendation system 100.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In some embodiments, the datastore 120 of the recommendation system 100 is at least a portion of the memory device 704 of the computing system 700.

The computing system 700 may also include a number of external or internal devices, such as input or output devices. For example, the computing system 700 is shown with one or more input/output ("I/O") interfaces 708. An I/O interface 300 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the graph construction subsystem 130, the trending hashtag subsystem 140, the GNN 150, or other aspects of the recommendation system 100. The program code may be resident in the memory device 704 or any suitable computer-readable medium and may be executed by the processor 702 or any other suitable processor.

The computing system 700 can access other models, datasets, or functions of the recommendation system 100 in any suitable manner. In some embodiments, some or all of one or more of these models, datasets, and functions are stored in the memory device 704 of a computer system 700, as in the example depicted in FIG. 7. In other embodiments, a separate computing system can provide access to necessary models, datasets, and functions as needed. For instance, as mentioned above, the GNN 150 can be copied to the computing system 700 after training. Additionally or alternatively, data in the datastore 120 may be obtained from or copied from another computing device. In additional or alternative embodiments, one or more models, datasets, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices (e.g., a separate computing device acting as a client 110) via a data network using the network interface device 710.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
    accessing a graph comprising:
        video nodes representing videos,
        historical hashtag nodes representing historical hashtags, and
        edges indicating associations among the video nodes and the historical hashtag nodes;
    identifying a trending hashtag;
    adding, to the graph, an edge between a historical hashtag node representing a historical hashtag of the historical hashtags and a trending hashtag node representing the trending hashtag, based on a semantic similarity between the historical hashtag and the trending hashtag;
    adding, to the video nodes of the graph, a new video node representing a new video;
    utilizing a graph neural network (GNN) applied to a subset of the edges of the graph to predict a new edge between the trending hashtag node and the new video node, the subset of the edges omitting video-to-video edges that are between multiple video nodes in the graph; and
    recommending the trending hashtag for the new video based on prediction of the new edge between the trending hashtag node and the new video node.

2. The method of claim 1, further comprising determining the semantic similarity between the historical hashtag and the trending hashtag, wherein determining the semantic similarity comprises:
    determining a first vector representing the trending hashtag;
    determining a second vector representing the historical hashtag; and
    computing a distance between the first vector and the second vector.

3. The method of claim 2, wherein determining the first vector representing the trending hashtag comprises:
    splitting the trending hashtag into a first word and a second word;
    determining a first embedding vector for the first word and a second embedding vector for the second word; and
    combining the first embedding vector and the second embedding vector to determine the first vector representing the trending hashtag.

4. The method of claim 3, wherein computing the distance between the first vector and the second vector comprises computing a cosine distance between the first vector representing the trending hashtag and the second vector representing the historical hashtag.

5. The method of claim 1, further comprising:
    receiving trending hashtags used on a social media platform; and adding, to the graph, a respective trending hashtag node representing each trending hashtag in the trending hashtags.

6. The method of claim 1, further comprising:
adding, to the edges of the graph, a video-to-hashtag edge between a particular video node representing a particular video of the videos and an additional historical hashtag node representing an additional historical hashtag of the historical hashtags, based on the additional historical hashtag node being a tag for the particular video.

7. The method of claim 6, further comprising:
adding, to the edges of the graph, a particular video-to-video edge between the particular video node and an additional video node representing an additional video of the videos, based on the particular video and the additional video having one or more of the historical hashtags in common.

8. The method of claim 1, further comprising:
adding, to the edges of the graph, a hashtag-to-hashtag edge between a first historical hashtag node representing a first historical hashtag of the historical hashtags and a second historical hashtag node representing a second historical hashtag of the historical hashtags, based on the first historical hashtag and the second historical hashtag being associated with a common video.

9. The method of claim 1, further comprising training the GNN to predict one or more edges in the graph.

10. The method of claim 1, wherein adding, to the video nodes of the graph, the new video node representing the new video comprises:
extracting a set of frames from the new video; and
processing the set of frames through a neural network trained to extract frame features.

11. A system comprising:
a memory component; and
a processing device coupled to the memory component, the processing device to perform operations comprising:
accessing a graph comprising:
video nodes representing videos,
historical hashtag nodes representing historical hashtags, and
edges indicating associations among the video nodes and the historical hashtag nodes;
identifying a trending hashtag;
adding, to the graph, an edge between a historical hashtag node representing a historical hashtag of the historical hashtags and a trending hashtag node representing the trending hashtag, based on a semantic similarity between the historical hashtag and the trending hashtag;
adding, to the video nodes of the graph, a new video node representing a new video;
utilizing a graph neural network (GNN) applied to a subset of the edges of the graph to predict a new edge between the trending hashtag node and the new video node, the subset of the edges omitting video-to-video edges that are between multiple video nodes in the graph; and
recommending the trending hashtag for the new video based on prediction of the new edge between the trending hashtag node and the new video node.

12. The system of claim 11, the operations further comprising determining the semantic similarity between the historical hashtag and the trending hashtag, wherein determining the semantic similarity comprises:
determining a first vector representing the trending hashtag;
determining a second vector representing the historical hashtag; and
computing a distance between the first vector and the second vector.

13. The system of claim 12, wherein determining the first vector representing the trending hashtag comprises:
splitting the trending hashtag into a first word and a second word;
determining a first embedding vector for the first word and a second embedding vector for the second word; and
combining the first embedding vector and the second embedding vector to determine the first vector representing the trending hashtag.

14. The system of claim 11, the operations further comprising:
adding, to the edges of the graph, a video-to-hashtag edge between a particular video node representing a particular video of the videos and an additional historical hashtag node representing an additional historical hashtag of the historical hashtags, based on the additional historical hashtag node being a tag for the particular video.

15. The system of claim 14, the operations further comprising:
adding, to the edges of the graph, a video-to-video edge between the particular video node and an additional video node representing an additional video of the videos, based on the particular video and the additional video having one or more of the historical hashtags in common.

16. The system of claim 11, the operations further comprising:
adding, to the edges of the graph, a hashtag-to-hashtag edge between a first historical hashtag node representing a first historical hashtag of the historical hashtags and a second historical hashtag node representing a second historical hashtag of the historical hashtags, based on the first historical hashtag and the second historical hashtag being associated with a common video.

17. A non-transitory computer-readable medium storing executable instructions, which when executed by a processing device, cause the processing device to perform operations comprising:
accessing a graph comprising:
video nodes representing videos,
historical hashtag nodes representing historical hashtags, and
edges indicating associations among the video nodes and the historical hashtag nodes;
identifying a trending hashtag;
adding, to the graph, an edge between a historical hashtag node representing a historical hashtag of the historical hashtags and a trending hashtag node representing the trending hashtag, based on a semantic similarity between the historical hashtag and the trending hashtag;
adding, to the video nodes of the graph, a new video node representing a new video;
utilizing a graph neural network (GNN) applied to a subset of the edges of the graph to predict a new edge between the trending hashtag node and the new video node, the subset of the edges omitting video-to-video edges that are between multiple video nodes in the graph; and recommending the trending hashtag for the new video based on prediction of the new edge between the trending hashtag node and the new video node.

18. The non-transitory computer-readable medium of claim 17, further comprising determining the semantic similarity between the historical hashtag and the trending hashtag, wherein determining the semantic similarity comprises:

determining a first vector representing the trending hashtag;

determining a second vector representing the historical hashtag; and computing a distance between the first vector and the second vector.

19. The non-transitory computer-readable medium of claim 18, wherein determining the first vector representing the trending hashtag comprises:

splitting the trending hashtag into a first word and a second word;

determining a first embedding vector for the first word and a second embedding vector for the second word; and combining the first embedding vector and the second embedding vector to determine the first vector representing the trending hashtag.

20. The non-transitory computer-readable medium of claim 17, the operations further comprising:

adding, to the edges of the graph, a video-to-hashtag edge between a particular video node representing a particular video of the videos and an additional historical hashtag node representing an additional historical hashtag of the historical hashtags, based on the additional historical hashtag node being a tag for the particular video;

adding, to the edges of the graph, a video-to-video edge between the particular video node and an additional video node representing an additional video of the videos, based on the particular video and the additional video having one or more of the historical hashtags in common; and adding, to the edges of the graph, a hashtag-to-hashtag edge between a first historical hashtag node representing a first historical hashtag of the historical hashtags and a second historical hashtag node representing a second historical hashtag of the historical hashtags, based on the first historical hashtag and the second historical hashtag being associated with a common video.

* * * * *